US009810859B2

(12) United States Patent
Scherer et al.

(10) Patent No.: US 9,810,859 B2
(45) Date of Patent: Nov. 7, 2017

(54) TRACEABLE NETWORKING CABLES WITH REMOTE-RELEASED CONNECTORS

(71) Applicant: MERTEK Industries, LLC, Austin, TX (US)

(72) Inventors: Christopher B. Scherer, Austin, TX (US); Jon Sholtis, Austin, TX (US)

(73) Assignee: MERTEK INDUSTRIES, LLC, Austin, TX (US)

( * ) Notice: Subject to any disclaimer, the term of this patent is extended or adjusted under 35 U.S.C. 154(b) by 0 days.

(21) Appl. No.: 14/913,131

(22) PCT Filed: Aug. 21, 2014

(86) PCT No.: PCT/US2014/052040
§ 371 (c)(1),
(2) Date: Feb. 19, 2016

(87) PCT Pub. No.: WO2015/027033
PCT Pub. Date: Feb. 26, 2015

(65) Prior Publication Data
US 2016/0209604 A1    Jul. 21, 2016

Related U.S. Application Data

(60) Provisional application No. 61/868,193, filed on Aug. 21, 2013.

(51) Int. Cl.
*G02B 6/36* (2006.01)
*G02B 6/38* (2006.01)
(Continued)

(52) U.S. Cl.
CPC ............. *G02B 6/3895* (2013.01); *G02B 6/36* (2013.01); *G02B 6/387* (2013.01); *G02B 6/3817* (2013.01);
(Continued)

(58) Field of Classification Search
CPC .. G02B 6/3893; G02B 6/3895; G02B 6/4281; H01R 13/6335; H01R 13/641; H01R 13/64
See application file for complete search history.

(56) References Cited

U.S. PATENT DOCUMENTS

| 3,960,428 A | 6/1976 | Naus et al. .................. 439/315 |
| 4,761,720 A | 8/1988 | Solow .......................... 362/235 |

(Continued)

FOREIGN PATENT DOCUMENTS

| CN | 1331505 | 1/2002 |
| CN | 1738108 | 2/2006 |

(Continued)

OTHER PUBLICATIONS

International Search Report and Written Opinion issued in PCT/US2014/052040, dated Dec. 8, 2014.

*Primary Examiner* — Rhonda Peace
(74) *Attorney, Agent, or Firm* — Norton Rose Fulbright US LLP (57) ABSTRACT

Disclosed are traceable remote-release networking cables with telltales at their ends to facilitate tracing of the cables and their ends, such as, for example, in data rooms that can include hundreds of individual networking cables. Some cables include conductive wire transmission line(s). Other cables include one or more fiber-optic transmission lines.

22 Claims, 9 Drawing Sheets

(51) Int. Cl.
  *H01R 13/641* (2006.01)
  *H01R 13/717* (2006.01)
  *H04Q 1/02* (2006.01)
  *H01R 13/70* (2006.01)
  *H01R 24/64* (2011.01)

(52) U.S. Cl.
  CPC ......... *G02B 6/3893* (2013.01); *H01R 13/641* (2013.01); *H01R 13/7175* (2013.01); *H04Q 1/136* (2013.01); *H01R 13/70* (2013.01); *H01R 24/64* (2013.01)

(56) References Cited

U.S. PATENT DOCUMENTS

| | | | | |
|---|---|---|---|---|
| 4,837,488 A | 6/1989 | Danahue | | 324/66 |
| 5,159,316 A | 10/1992 | Lazzara | | 340/568.2 |
| 5,666,453 A | 9/1997 | Dannenmann | | 385/101 |
| 5,741,152 A | 4/1998 | Boutros | | 439/490 |
| 5,764,043 A | 6/1998 | Czosnowski et al. | | 324/66 |
| 5,888,100 A | 3/1999 | Bofill et al. | | 439/676 |
| 6,002,331 A | 12/1999 | Laor | | 340/539.1 |
| 6,080,007 A | 6/2000 | Dupuis et al. | | 439/418 |
| 6,099,345 A | 8/2000 | Milner et al. | | 439/460 |
| 6,244,908 B1 | 6/2001 | Hammond et al. | | 439/676 |
| 6,280,232 B1 | 8/2001 | Beecher et al. | | 439/418 |
| 6,394,853 B1 | 5/2002 | Hammond et al. | | 439/676 |
| 6,524,128 B2 | 2/2003 | Marowsky et al. | | 439/418 |
| 6,532,328 B1 | 3/2003 | Kline | | 385/101 |
| 6,558,204 B1 | 5/2003 | Weatherley | | 439/676 |
| 6,577,243 B1 | 6/2003 | Dannenmann et al. | | 340/815.45 |
| 6,790,096 B2 | 9/2004 | Lin | | 439/676 |
| 6,798,183 B2 | 9/2004 | Bohley et al. | | 324/66 |
| 6,811,445 B2 | 11/2004 | Caveney et al. | | 439/676 |
| 6,975,242 B2 | 12/2005 | Dannenmann et al. | | 340/815.45 |
| 7,049,937 B1 | 5/2006 | Zweig et al. | | 340/657 |
| 7,080,945 B2 | 7/2006 | Colombo et al. | | 385/92 |
| 7,081,808 B2 | 7/2006 | Colombo et al. | | 398/166 |
| 7,168,994 B2 | 1/2007 | Caveney et al. | | 439/676 |
| 7,221,284 B2 * | 5/2007 | Scherer | | G01R 31/045 340/286.02 |
| 7,226,217 B1 * | 6/2007 | Benton | | G02B 6/3825 385/88 |
| 7,335,066 B2 | 2/2008 | Carroll et al. | | 439/676 |
| 7,374,458 B2 | 5/2008 | Caveney et al. | | 439/676 |
| 7,547,150 B2 | 6/2009 | Downie et al. | | 385/92 |
| 7,549,886 B2 | 6/2009 | Herring et al. | | 439/352 |
| 7,556,536 B2 | 7/2009 | Caveney et al. | | 439/676 |
| 7,651,361 B2 * | 1/2010 | Henry | | H01R 13/6335 439/352 |
| 7,760,094 B1 | 7/2010 | Kozischek et al. | | 340/572.1 |
| 7,772,975 B2 | 8/2010 | Downie et al. | | 340/572.1 |
| 7,782,202 B2 | 8/2010 | Downie et al. | | 340/572.1 |
| 7,910,833 B2 | 3/2011 | McGinley et al. | | 174/112 |
| 7,910,834 B2 | 3/2011 | McGinley et al. | | 174/112 |
| 7,920,764 B2 | 4/2011 | Kewitsch | | 385/101 |
| 7,940,182 B2 | 5/2011 | Lange et al. | | 340/572.1 |
| 7,960,648 B2 | 6/2011 | McGinley et al. | | 174/36 |
| 7,965,186 B2 | 6/2011 | Downie et al. | | 340/572.1 |
| 7,972,183 B1 | 7/2011 | Lin | | 439/676 |
| 8,043,124 B2 | 10/2011 | Caveney et al. | | 439/676 |
| 8,113,723 B2 * | 2/2012 | Togami | | G02B 6/4246 385/53 |
| 8,172,466 B2 * | 5/2012 | Uemura | | G02B 6/4201 385/14 |
| 8,210,755 B2 | 7/2012 | Lavranchuk | | 385/53 |
| 8,264,355 B2 | 9/2012 | Kozischek et al. | | 340/572.1 |
| 8,277,260 B2 | 10/2012 | Caveney et al. | | 439/676 |
| 8,465,317 B2 | 6/2013 | Gniadek et al. | | 439/344 |
| 8,556,645 B2 * | 10/2013 | Crain | | H01R 13/6272 438/258 |
| 8,585,426 B2 * | 11/2013 | Zerebilov | | H01R 13/6275 439/370 |
| 8,606,972 B2 | 12/2013 | Abuelsaad et al. | | 710/16 |
| 8,611,234 B1 | 12/2013 | Gershman | | 370/251 |
| 8,620,123 B2 | 12/2013 | Dean, Jr. et al. | | 385/102 |
| 8,702,453 B2 | 4/2014 | Caveney et al. | | 439/676 |
| 8,747,141 B2 * | 6/2014 | Crain | | H01R 13/6272 439/258 |
| 8,757,895 B2 * | 6/2014 | Petersen | | G02B 6/3817 385/147 |
| 9,196,975 B2 * | 11/2015 | Scherer | | H01R 9/032 |
| 9,246,262 B2 | 1/2016 | Brown | | H01R 13/62 |
| 9,405,080 B2 * | 8/2016 | Lambourn | | G02B 6/42 |
| 2002/0031955 A1 | 3/2002 | Schmidt et al. | | 439/676 |
| 2002/0048990 A1 | 4/2002 | Marowsky et al. | | 439/418 |
| 2003/0157842 A1 | 8/2003 | Arnett et al. | | 439/676 |
| 2003/0199192 A1 | 10/2003 | Caveney et al. | | 439/418 |
| 2003/0222786 A1 | 12/2003 | Dannenmann et al. | | 340/815.45 |
| 2004/0038564 A1 | 2/2004 | Yan | | 439/76.1 |
| 2004/0160774 A1 | 8/2004 | Lionetti et al. | | 362/253 |
| 2005/0037672 A1 | 2/2005 | Caveney et al. | | 439/692 |
| 2005/0224585 A1 | 10/2005 | Durrant et al. | | 235/492 |
| 2006/0134996 A1 | 6/2006 | Caveney et al. | | 439/676 |
| 2006/0162947 A1 | 7/2006 | Bolouri-Saransar et al. | | 174/36 |
| 2006/0232385 A1 | 10/2006 | Scherer et al. | | 340/286.02 |
| 2007/0105453 A1 | 5/2007 | Caveney et al. | | 439/676 |
| 2007/0116411 A1 | 5/2007 | Benton et al. | | 385/53 |
| 2007/0190863 A1 | 8/2007 | Caveney et al. | | 439/676 |
| 2008/0020658 A1 | 1/2008 | Provost | | 440/71 |
| 2008/0122579 A1 | 5/2008 | German et al. | | 340/10.1 |
| 2009/0042431 A1 | 2/2009 | Herring et al. | | 439/341 |
| 2009/0269973 A1 | 10/2009 | Caveney et al. | | 439/460 |
| 2009/0275228 A1 * | 11/2009 | Henry | | H01R 13/6272 439/352 |
| 2010/0079248 A1 | 4/2010 | Greveling | | 340/10.1 |
| 2010/0098425 A1 | 4/2010 | Kewitsch | | 398/116 |
| 2011/0043333 A1 | 2/2011 | German | | 340/10.1 |
| 2011/0116748 A1 | 5/2011 | Smrha et al. | | 385/76 |
| 2011/0222819 A1 * | 9/2011 | Anderson | | G02B 6/3825 385/78 |
| 2012/0058689 A1 | 3/2012 | Caveney et al. | | 439/676 |
| 2012/0064750 A1 | 3/2012 | Wu | | 439/345 |
| 2013/0039624 A1 * | 2/2013 | Scherer | | H01R 9/032 385/92 |
| 2013/0052860 A1 | 2/2013 | Caveney et al. | | 439/460 |
| 2014/0313042 A1 * | 10/2014 | Scherer | | H01R 13/641 340/660 |
| 2015/0340818 A1 * | 11/2015 | Scherer | | H01R 13/641 307/125 |
| 2016/0020975 A1 | 1/2016 | Scherer et al. | | 370/248 |
| 2016/0054527 A1 * | 2/2016 | Tang | | G02B 6/3893 385/92 |
| 2016/0209604 A1 * | 7/2016 | Scherer | | G02B 6/36 |

FOREIGN PATENT DOCUMENTS

| | | |
|---|---|---|
| CN | 101299502 | 11/2008 |
| CN | 101572363 | 11/2009 |
| CN | 101572369 | 11/2009 |
| CN | 102859807 | 1/2013 |
| WO | WO 2011/139341 | 11/2011 |

\* cited by examiner

TRACEABLE NETWORKING CABLES WITH REMOTE-RELEASED CONNECTORS

CROSS-REFERENCE TO RELATED APPLICATIONS

This application is a national phase application under 35 U.S.C. §371 of International Application No. PCT/US2014/052040, filed Aug. 21, 2014, which claims priority to United Stated Provisional Patent Application No. 61/868,193, filed Aug. 21, 2013, all of which applications are incorporated by reference in their entireties.

BACKGROUND

1. Field of the Invention

The present invention relates generally to fiber optic cables, and more particularly, but not by way of limitation, to traceable (e.g., networking) cables.

2. Description of Related Art

Examples of traceable networking cables are disclosed in U.S. Pat. Nos. 7,221,284; 6,577,243; and US 2013/0039624. Examples of fiber-optic networking cables with remote release tabs are disclosed in U.S. Pat. No. 8,465,317.

SUMMARY

This disclosure includes embodiments of traceable (e.g., networking) cables and related kits and methods.

Some embodiments of the present networking cables for transmitting data, comprise: one or more transmission lines encased in a flexible sheath; a connector hood on each end of the networking cable (each connector hood comprising: a distal end configured to extend into a mating connector or jack; a lever configured to engage the mating connector or jack to resist removal of the distal end; and an extender configured to be coupled to the lever and configured to be pulled longitudinally away from the distal end to draw a portion of the lever laterally toward one or more cables); at least one conducting wire deployed along the length of the one or more transmission lines; an electrically activated telltale incorporated into one of the connector hoods; an electric power source incorporated into one of the connector hoods; a manually operated switch incorporated into one of the connector hoods and electrically connected to the electrically activated telltale, the electric power source, and the at least one conductor, and configured to be actuated to activate the electrically activated telltale.

Some embodiments of the present networking cables further comprise: a second electrically activated telltale incorporated into the other of the connector hoods; where the manually operated switch is configured be actuated to activate both telltales. In some embodiments, the electrically activated telltale is coupled to the extender of the connector hood. In some embodiments, the manually operated switch is coupled to the extender of the connector hood. In some embodiments, the electric power source is coupled to the extender of the connector hood. Some embodiments further comprise: a flexible circuit coupled to the extender of one of the connector hoods and electrically coupled the electrically activated telltale, the electric power source, the at least one conductor, and the manually operated switch. In some embodiments, the one or more transmission lines comprise one or more fiber optic cables. In some embodiments, the one or more transmission lines comprise two fiber optic cables.

In some embodiments of the present networking cables, the one or more transmission lines comprise a plurality of conductor wire pairs. Some embodiments further comprise: a separator mechanism incorporated into each connector hood to provide separation of the conductor wire pairs to minimize crosstalk.

In some embodiments of the present networking cables, at least one of the connector hoods further comprises a connector body, and the extender is slidably coupled to the connector body. In some embodiments, the connector body defines a slot, and the extender is configured to be slidably disposed in the slot. In some embodiments, the extender is configured to be removably coupled to the connector body. In some embodiments, the extender comprises a circuit that includes the electrically activated telltale, the electric power source, the manually operated switch, and at least one first conductive contact; the at least one conductor is in electrical communication with at least one second conductive contact on the connector body; and the at least one first conductive contact is configured to contact the at least one second conductive contact to provide an electrical connection between the circuit and the at least one conductor that can be maintained during movement of the extender relative to the connector body. In some embodiments, the circuit comprises a flexible circuit. In some embodiments, the at least one second conductive contact is unitary with the at least one conductor.

Some embodiments of the present networking cables further comprise: an integrated circuit chip, incorporated into at least one of the connector hoods and in electrical connection with the electrically activated telltale; where the integrated circuit chip completes the circuit for a prescribed amount of time when activated by the manually operated switch. In some embodiments, the integrated circuit chip pulses the power to the electrically activated telltale for a prescribed amount of time. In some embodiments, the electrically activated telltale emits an audio or visual signal. In some embodiments, the electrically activated telltale is selected from the group consisting of a light emitting diode, a conventional light bulb, and a liquid crystal visual indicator. In some embodiments, the electric power source includes a battery. In some embodiments, the electric power source includes a solar cell configured to charge the battery.

Some embodiments of the present methods (e.g., of assembling a connector hood for a networking cable) comprise: coupling an extender to a connector body such that the extender can slide relative to the connector body. In some embodiments, the connector body comprises: a distal end configured to extend into a mating connector or jack; and a lever configured to engage the mating connector or jack to resist removal of the distal end; the extender is coupled to the lever such that the extender can be pulled longitudinally away from the distal end to draw a portion of the lever laterally inward toward a longitudinal axis of the connector body; an electrically activated telltale incorporated into one of the connector body and the extender; and a manually operated switch is incorporated into one of the connector body and the extender, and electrically connected to the electrically activated telltale. In some embodiments, the connector hood is coupled to a cable that comprises one or more transmission lines and at least one conducting wire deployed along the length of the one or more transmission lines. In some embodiments, the one or more transmission lines comprise one or more fiber optic cables. In some embodiments, the one or more transmission lines comprise two fiber optic cables.

In some embodiments of the present methods, the one or more transmission lines comprise a plurality of conductor wire pairs. In some embodiments, a separator mechanism is incorporated into each connector hood to provide separation of the conductor wire pairs to minimize crosstalk. In some embodiments, an electric power source is incorporated into one of the connector body and the extender; and the manually operated switch is electrically connected to the electrically activated telltale, the electric power source, and the at least one conductor, and configured to be actuated to activate the electrically activated telltale. In some embodiments, the electric power source includes a battery. In some embodiments, the electric power source includes a solar cell configured to charge the battery. In some embodiments, the electrically activated telltale is coupled to the extender of the connector hood. In some embodiments, the manually operated switch is coupled to the extender of the connector hood. In some embodiments, the electric power source is coupled to the extender of the connector hood. In some embodiments, a flexible circuit is incorporated into the extender and electrically coupled the electrically activated telltale and the manually operated switch. In some embodiments, the connector body defines a slot, and the extender is configured to be slidably disposed in the slot. In some embodiments, the extender is configured to be removably coupled to the connector body. In some embodiments, the extender comprises a circuit that includes the electrically activated telltale, the manually operated switch, and at least one first conductive contact; at least one second conductive contact is incorporated into the connector body; and the at least one first conductive contact is configured to contact the at least one second conductive contact to provide an electrical connection between the circuit and the at least one second conductive contact that can be maintained during movement of the extender relative to the connector body. In some embodiments, the circuit comprises a flexible circuit.

The term "coupled" is defined as connected, although not necessarily directly, and not necessarily mechanically; two items that are "coupled" may be unitary with each other. The terms "a" and "an" are defined as one or more unless this disclosure explicitly requires otherwise. The term "substantially" is defined as largely but not necessarily wholly what is specified (and includes what is specified; e.g., substantially 90 degrees includes 90 degrees and substantially parallel includes parallel), as understood by a person of ordinary skill in the art. In any disclosed embodiment, the terms "substantially," "approximately," and "about" may be substituted with "within [a percentage] of" what is specified, where the percentage includes 0.1, 1, 5, and 10 percent.

Further, a device or system that is configured in a certain way is configured in at least that way, but it can also be configured in other ways than those specifically described.

The terms "comprise" (and any form of comprise, such as "comprises" and "comprising"), "have" (and any form of have, such as "has" and "having"), "include" (and any form of include, such as "includes" and "including"), and "contain" (and any form of contain, such as "contains" and "containing") are open-ended linking verbs. As a result, an apparatus that "comprises," "has," "includes," or "contains" one or more elements possesses those one or more elements, but is not limited to possessing only those elements. Likewise, a method that "comprises," "has," "includes," or "contains" one or more steps possesses those one or more steps, but is not limited to possessing only those one or more steps.

Any embodiment of any of the apparatuses, systems, and methods can consist of or consist essentially of—rather than comprise/include/contain/have—any of the described steps, elements, and/or features. Thus, in any of the claims, the term "consisting of" or "consisting essentially of" can be substituted for any of the open-ended linking verbs recited above, in order to change the scope of a given claim from what it would otherwise be using the open-ended linking verb.

The feature or features of one embodiment may be applied to other embodiments, even though not described or illustrated, unless expressly prohibited by this disclosure or the nature of the embodiments.

Details associated with the embodiments described above and others are described below.

BRIEF DESCRIPTION OF THE DRAWINGS

The following drawings illustrate by way of example and not limitation. For the sake of brevity and clarity, every feature of a given structure is not always labeled in every figure in which that structure appears. Identical reference numbers do not necessarily indicate an identical structure. Rather, the same reference number may be used to indicate a similar feature or a feature with similar functionality, as may non-identical reference numbers. The figures are drawn to scale (unless otherwise noted), meaning the sizes of the depicted elements are accurate relative to each other for at least the embodiment depicted in the figures.

DESCRIPTION OF ILLUSTRATIVE EMBODIMENTS

Figure 1:
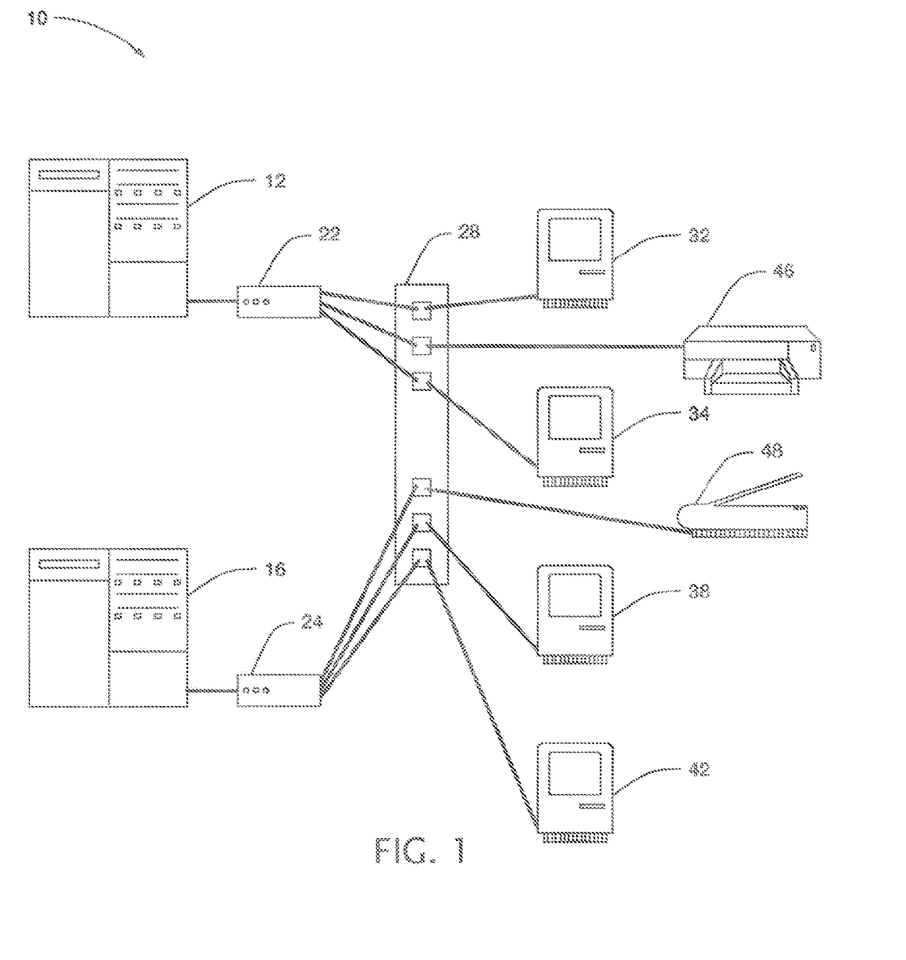
FIG. 1 is a schematic view of a networked computer environment.

Referring now to the drawings, and more particularly to FIG. 1, shown and designated by reference numeral 10 is an example of a networked environment that includes servers, computers, hubs, peripheral devices, and a cable panel. In the example, shown computers 32, 34, 38, and 42 are each connected by networking cables to a cable panel 28. The computers can be at multiple locations. Also attached to panel 28 by networking cables are peripheral devices such as printer 46 and scanner 48. Panel 28 is often located at a central room where service personnel can access it. From panel 28, multiple computers and peripheral devices are often linked by networked cables to hubs such as 22 and 24, which may be connected to servers 12 and 16. Multiple servers and hubs may be housed in a room. Various protocols (e.g., Ethernet) can be used to support data transfer between computers and servers. The example shown is relatively a small network, and networks may often be much larger. In addition to the devices shown in FIG. 1, networks can include, for example, other electronic devices such as workstations, switches, tape drives, storage devices, telephone switches, VOIP devices, routers, and/or any other device that may be connected to a network (e.g., a camera). With large networks, the total number of networking cables may be very large, and routine maintenance functions (e.g., the addition or change of computers) can require significant time and manpower to trace connections throughout the network.

In some embodiments, panel 28 may also represent an external power source that provides power to the various devices (32 34, 36, 38, 42, 46, 48), and at least some of the cables extending between the various devices and panel 28 may comprise power cables (e.g., AC power cables).

Figure 2:
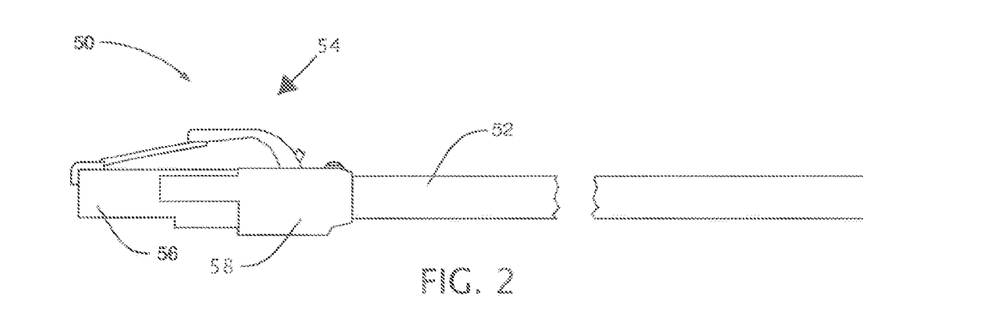
FIG. 2 is a side view of an end of one embodiment of the present networking cables.

FIG. 2 depicts an embodiment 50 of the present networking cables that may be used in the networked environment of FIG. 1. Cable 52, as used in networking applications, may comprise a plurality of insulated twisted conductor wire pairs encased in a flexible outer sheath (e.g., an outer cover sheath). The number of twisted conductor wire pairs (e.g., four conductor pairs with eight conductor wires, five conductor pairs with then conductor wires, etc.) can vary depending on the application. In the embodiment shown, a connector assembly or hood 54 comprises a connector 56 coupled to a boot 58, and the connector hood is coupled to an end of cable 52. An example of a typical connector 56 used for Ethernet networking applications is an RJ-45 or 8P8C connector, an eight-wire or eight-pin connector commonly used in networking computers. Another example of a connector 56 that may be used is an RJ-50 or 10P10C connector, a ten-conductor or ten-pin connector. Boot 58 may, for example, be overmolded onto connector 56 and/or cable 52. The overall connecter (connector plus boot) will be referred to as the connector hood in this description and in the appended claims.

Some well known standards for networking cables that may be included in cable 52 include Categories: 5 (which generally includes four insulated twisted copper wires encased in a flexible outer jacket layer), 5A, 5E, 6 (e.g., for Gigabit Ethernet and/or other network protocols), 7, and/or additional categories later developed. Later standards (e.g., Cat-6) are often backward compatible with earlier standards (e.g., CAT 5, CAT 3). Relative to Cat-5, Cat-6 specifications are generally more stringent for crosstalk and system noise. Cat-6, for example, provides performance of up to 250 MHz, and may be suitable for 10BASE-T, 100BASE-TX (Fast Ethernet), 1000BASE-T/1000BASE-TX (Gigabit Ethernet) and 10GBASE-T (10-Gigabit Ethernet). Cat-6 has a relatively lower maximum length when used for 10GBASE-T. Cat-6A cable, or Augmented Cat-6, is characterized for 500 MHz and has further improved alien crosstalk characteristics, allowing 10GBASE-T to be run for the same maximum cable length as other protocols. Several other standards are in use, and may be used in embodiments of the present traceable networking cables. In some embodiments, one or more (e.g., two in a conductor wire pair) additional conductor wires (which may be referred to as tracer wires or indicator wires) can be added to or included in a networking cable (e.g., a Cat-5 or Cat-6 cable) such that the additional conductor wire(s) are used in the tracing function described herein. For example, the use of a cable 52 with ten wires or conductors with eight-wire RJ-45 connectors allows one of the five conductor-wire pairs to be used as a continuous continuity path between electrically activated telltales (e.g., light) at the end of the cable. Cables, conductor wires, conductor wire pairs, and/or conductors in the present embodiments may be coaxial, twin-axial, twisted, untwisted, shielded, unshielded, and/or bonded, as is known in the art.

Figure 3:
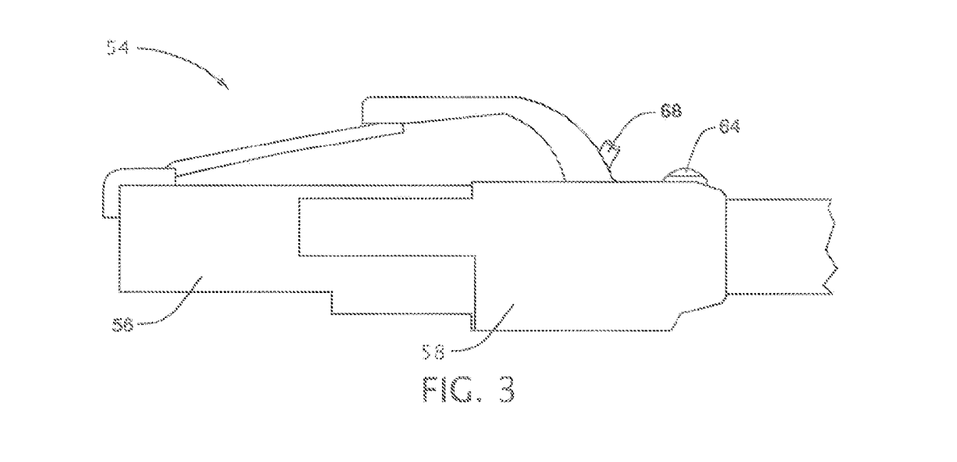
FIG. 3 is an enlarged side view of the end of FIG. 2.

FIG. 3 depicts an enlarged view of connector assembly or hood 54. In the embodiment shown, cable 50 comprises an electrically activated telltale 64 (which can be configured to produce a visual and/or an audio signal) incorporated into at least one of the connector hoods (e.g., hood 54, as shown). In the embodiment shown, telltale 64 is incorporated into a rear or proximal end of boot 58 near the cable. As used in this disclosure and the claims, an electrically activated telltale is any electrically triggered device that emits a visual or audio signal that can be detected by a human. One example of a suitable telltale is a light emitting diode (LED), but may alternatively or additionally include one or more other visual indicators (e.g., an incandescent or conventional light bulb, a liquid crystal visual indicator, etc.). In the embodiment shown, the cable also includes a button 68 that is configured to be manually pressed to engage a manual switch (72) incorporated into at least one of the connector hoods and configured to activate the telltale by initiating electrical communication between the electric power source and the telltale (e.g., via one or more of the conductors, such as, for example, a conductor wire, a conductor wire pair, an indicator wire, and/or indicator wire pair). For example, the switch can complete an indicator circuit that includes an LED to cause the LED to flash repeatedly for a predetermined time. In some embodiments, the indicator circuit includes the indicator wire or wire pair that runs the complete length of the networking cable. It is important to note that in some embodiments, the present networking cables include the hood of FIG. 2, on a first or "left" end of the networking cable, and a second hood (e.g., substantially similar to hood 54) on the second or "right" end of the cable (e.g., such that the two hoods are in electrical communication connection via a conductor wire, a conductor wire pair, an indicator wire, and/or indicator wire pair). For example, in an embodiment with a connector hood at each end of the cable, where each connector hood includes a switch and a telltale, the operation of either switch can activate both telltales if the telltales are not activated, or the operation of either switch can deactivate both telltales if the telltales are activated, as described in more detail below.

Telltale 64 and button 68 are shown in one suitable configuration relative to hood 54; in other embodiments, telltale 64 and/or button 68 can be incorporated into hood at any suitable position in hood 54. In other embodiments, the present cables can include connector hoods spaced apart from the terminal or end connectors of the cable. For example, some embodiments of the present cables can include a connector hood spaced inward relative to an end of the cable (e.g., by 1, 2, 3, 4, 5, or more inches), and the inwardly-spaced connector hood can include one or more of the tracing features or elements (e.g., a button, telltale, etc.) described in this disclosure.

Figure 4:
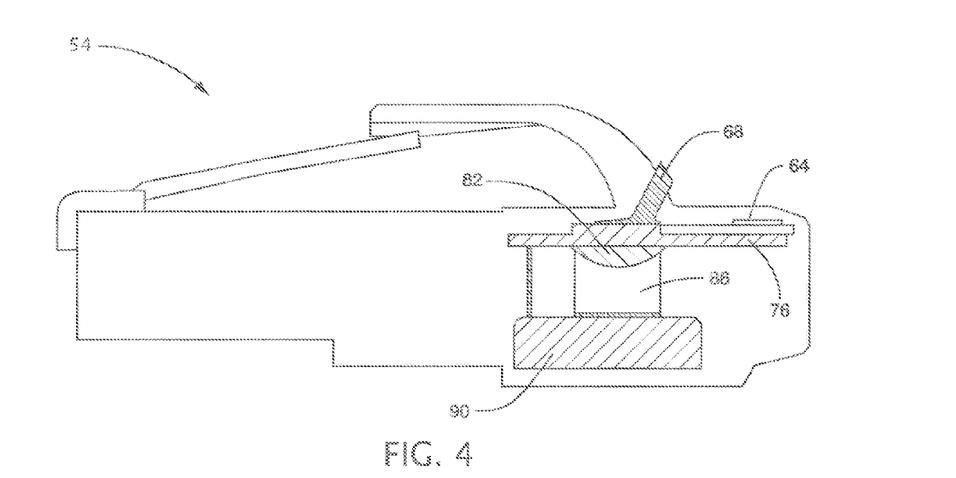
FIG. 4 is a cross-sectional view of a control unit of the cable of FIG. 2.
Figure 5:
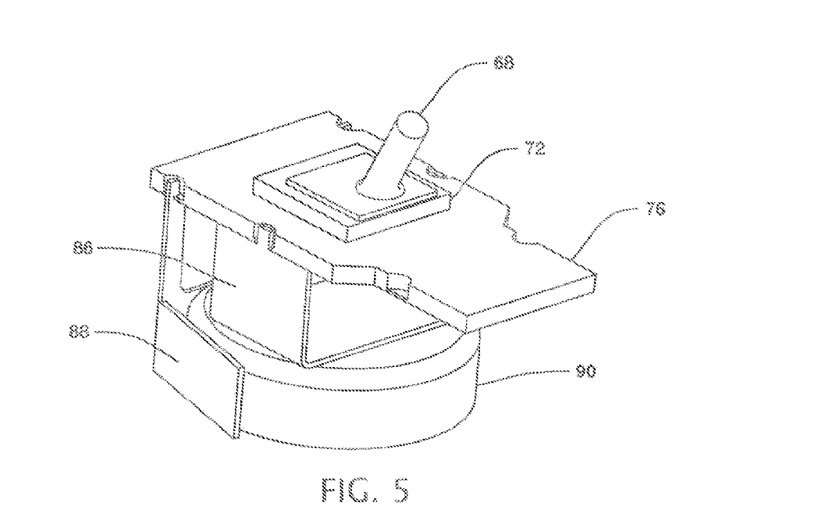
FIG. 5 is a perspective view of the control unit of FIG. 4.

Referring now to FIGS. 4 and 5, FIG. 4 depicts a cross-sectional side view of what may be referred to as a control unit of at least some internal components of the present cables, with the outline of the overall hood 54 shown for reference, and FIG. 5 depicts a perspective view of the control unit of FIG. 4. In the embodiment shown, button 68 is coupled (e.g., connected physically) to a switch 72 that, when manually engaged, completes an electrical circuit that powers telltale 64. In the embodiment shown, the cable comprises a printed circuit board (PCB) 76 to which switch 72 is coupled, and a controller 82 (e.g., integrated circuit) configured to have at least some of the functionality described in this disclosure. In some embodiments, the cable comprises more than one controller, each configured to provide at least a part of the functionality of the respective embodiment. In the embodiment shown, PCB 76 is coupled (e.g., such that an electrical connection or circuit can be completed through PCB 76) via a first or positive connection 86 and a second or negative connection 88. PCB 76 can be configured to include (e.g., via one or more appropriate conductive traces) a complete and/or completable (e.g., via switch 72) electrical circuit between telltale 64, switch 72, integrated circuit 82, and power source 90. Embodiments with two connector hoods may include a controller and/or battery in each of the two connector hoods (e.g., with one controller a "master" and one controller a "slave"), or can include a single controller and/or a single battery. For example, in some embodiments, the cable includes a single controller and a single battery in one of the two connection hoods, but includes a switch and telltale in each of the two connection hoods, such that depressing a switch at either end of the cable activates the telltales at both ends of the cable. In such embodiments, a similar PCB may be used in the hood without a controller or power source to provide the circuit between the switch and telltale.

In various embodiments of the present cables, the controller can be configured to include various functions. In some embodiments, the controller is configured to: activate the telltale for a predetermined amount of time (e.g., equal to, greater than, or between any of: 10, 15, 20, or 30 seconds) responsive to the switch being operated if (or when) the telltale is not active; and inactivate (or stop activation of) the telltale responsive to the switch being operated if the telltale is activated (e.g., during the predetermined amount of time during which the telltale is activated). In some embodiments, the controller is configured to: activate the telltale for a first predetermined amount of time (e.g., equal to, greater than, or between any of: 10, 15, 20, or 30 seconds) responsive to the switch being operated in a first manner (e.g., depressed and released once) if the telltale is not active; and activate the telltale for a second predetermined amount of time (e.g., equal to, greater than, or between any of: 30, 40, 50, or 60 seconds) responsive to the switch being operated in a second manner (e.g., depressed and released twice within 2 seconds, depressed and held down for 2 seconds or more, etc.) if the telltale is not active. In such embodiments (in which the controller is configured to activate the telltale for one of two predetermined periods of time depending on the manner in which the switch is operated), the circuit may include multiple timing resistors (136), as described below. In some embodiments, the controller is configured to activate the telltale (e.g., differently than the way in which the telltale is activated responsive to the switch being operated) if the voltage of the battery falls below a threshold voltage (e.g., 1.8V for a 3V battery). For example, in some embodiments, the controller is configured to turn the telltale on continuously, or to pulse the telltale intermittently at a rate that is slower than the rate at which the telltale is pulsed responsive to operation of the switch, if the battery voltage falls below the threshold voltage.

In some embodiments, an integrated circuit is used that provides several options for an end user. For example, an integrated circuit can be configured to activate the telltales to a) flash for 20 seconds responsive to a button being pushed once, and then shut off automatically, b) flash for 40 seconds responsive to a button being held down for 3 seconds, and then shut off automatically, c) shut off responsive to a button being pushed once on either end while the telltales are active, and d) flash indefinitely responsive to a button being pressed 3 times in a row, and shut off responsive to a button being pushed once.

Figure 6:
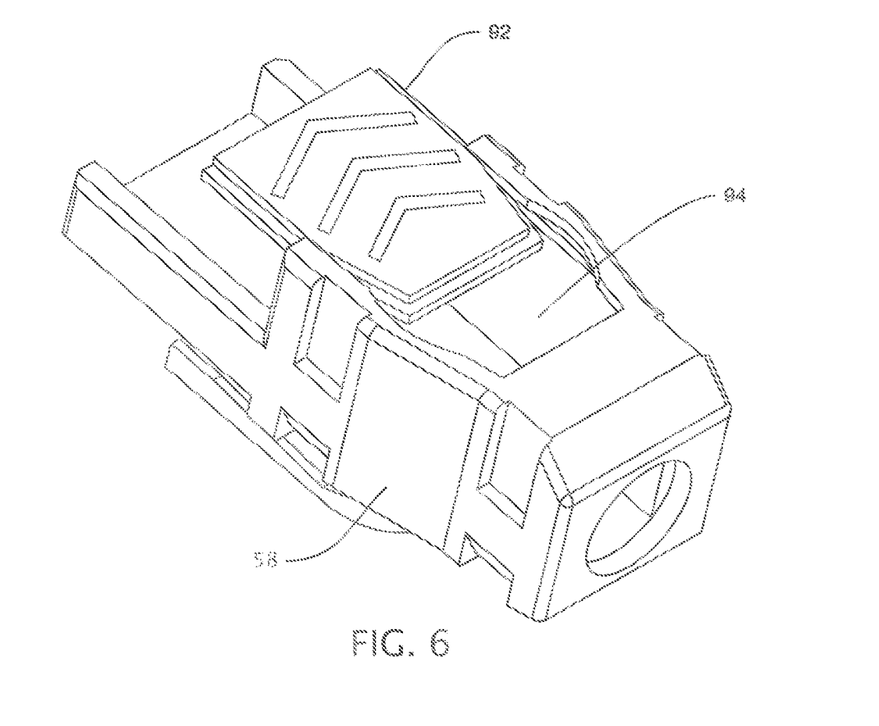
FIG. 6 is a lower perspective view of a portion of the cable of FIG. 2.

FIG. 6 depicts a lower perspective view of boot 58. In the embodiment shown, boot 58 is configured for an embodiment in which power source 90 is a battery. For example, in the embodiment shown, boot 58 comprises a door 92 configured to be moved to an open position to expose a battery port 94 configured to receive the battery (e.g., into which the battery can be inserted). A variety of batteries can be used for embodiments of the present cables. For example, for the circuit components discussed above, a CR927 lithium or other 3-volt battery can be used. A number of similar batteries are available from a variety of manufacturers, and any battery can be used that permits the functionality described in this disclosure.

Figure 7:
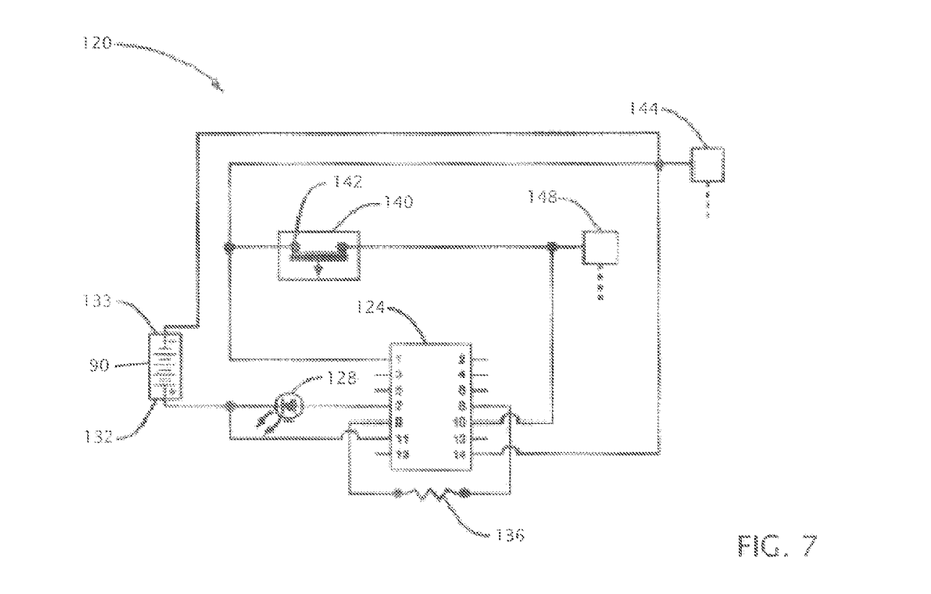
FIG. 7 is a schematic view of the control unit of FIG. 4.

FIG. 7 depicts a schematic of one embodiment 120 of a direct current (DC) circuit for a connection hood of the present cables. An integrated circuit 124 is shown as an example of a controller 82 (FIG. 4). A light emitting diode (LED) 128 is shown as an example of a telltale 64. In the embodiment shown, LED 128 is in electrical connection with pin 7 of chip 124 and a first or positive connection 132 of battery 90, as well as with pin 11 of chip 124 via the connection between LED 128 and battery 90. Resistor 136 is connected across pins 8 and 9 of chip 124, and is configured to determine the frequency and duration of power pulses sent to LED 128. For example with an X1622 IC chip (available from Fulikai Electronic Technologies (China)), a 220-ohm resistor 136 will deliver pulses that cause LED 128 to blink for about 19 seconds. A smaller resistor (resistor with lower resistance) will increase the frequency of blinking and shorten the total duration of blinking In embodiments in which the controller (e.g., IC chip) is configured to activate the telltale(s) for one of two or more predetermined times depending on the manner in which a switch is operated, the circuit can include two or more resistors 136 (e.g., each with a different resistance) to provide different durations of activation for the telltale(s). A switch 140 is shown as an example of switch 72 (FIG. 5) is operable to start the pulsing of power to the LED for the prescribed or predetermined amount of time. The ground or negative side 133 of battery 90 is connected to a first side 142 of switch 140, as well as pins 1 and 14 of integrated circuit 124. Finally, circuit 120 is connected to an indicator wire pair with conductors 144 and 148. Indicator wire pair 144 and 148 can connect to a second circuit in the second connector hood, and as discussed above, the second circuit can be identical to or may differ from circuit 120, as long as when a switch (e.g., 140) on either end is engaged, both telltales are activated.

Figure 8:
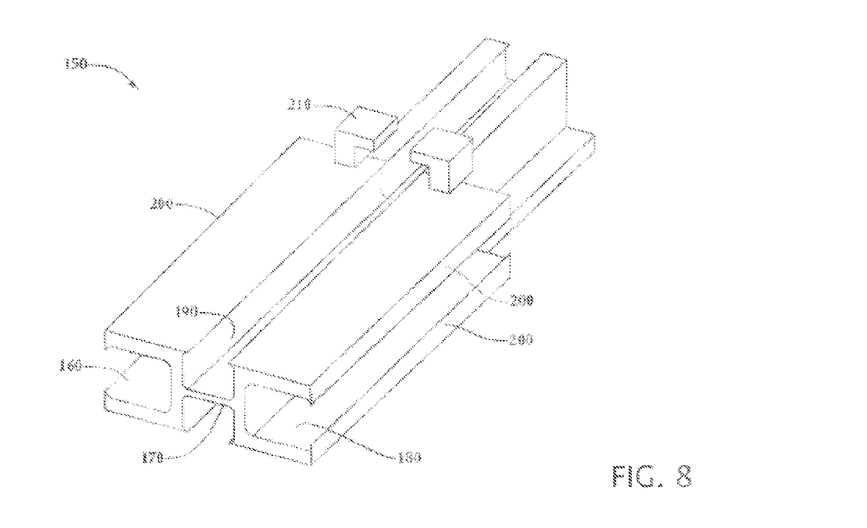
FIG. 8 is a view of a separator portion of the cable of FIG. 2.

FIG. 8 illustrates an embodiment 150 of a separator for reducing crosstalk between conductor wire pairs. In the embodiment shown, separator 150 is sized to fit completely within connector hood 54. Separator 150 can comprise (e.g., can be molded from) a non-conductive material, and can include a plurality of channels 160, 170, 180, and 190 each for a different one of four conductive (e.g., twisted) wire pairs (e.g., from cable 52).

In the embodiment shown, separator 150 is configured to maintain separation between wire pairs through the length of connector hood 54 (e.g., between the exposed ends of the wires in the connector and an end of outer cable insulation that is stripped to connect the cable to the hood 54). In some embodiments, one of the channels (e.g., channel 180) may carry the indicator wire or wire pair in addition to the respective conductor wire pair.

Figure 9:
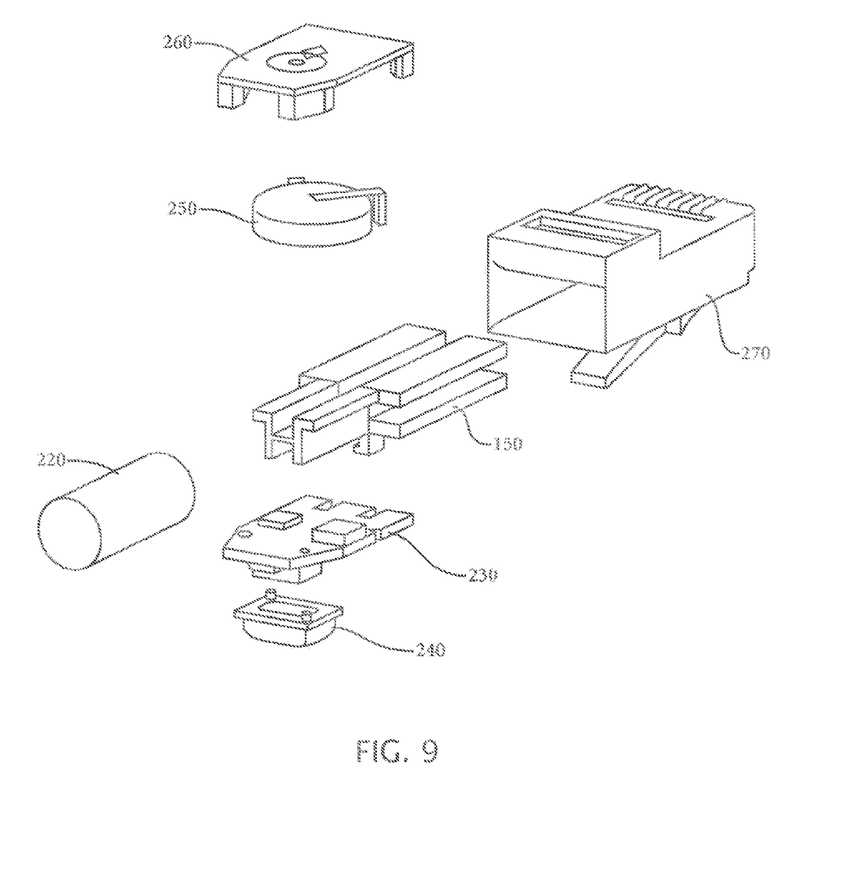
FIG. 9 is an exploded perspective view of a portion of the cable of FIG. 2.

In the embodiment shown, separator 150 is configured to allow or permit the inclusion of a suitable circuit (e.g., 120) within connector hood 54 while meeting the requirements for minimal crosstalk required by Cat-6 and/or Cat-6A standards. For example, FIG. 9 illustrates an exploded view of one embodiment of the present cables that includes separator 150. As described above, separator 150 accepts and separates four twisted wire pairs (not shown) from cable 220, as described above (e.g., the four conductor wire pairs and indicator wire or wire pair can respectively be disposed or channeled in the four channels of separator 150). A printed circuit board (PCB) 230 (which may be similar to PCB 76), containing or coupled to the electronics (e.g., as described for circuit 120) for the tracer functionality can be disposed below and/or coupled to separator 150 (and connected to the indicator wire or wire pair). A button 240 (e.g., similar to button 68) can be disposed below PCB 230 such that button 240 can be depressed to operate the switch. An electric power source 250 (similar to power source 90, e.g., a battery) can be disposed between separator 150 and a power source cover 260. In the embodiment shown, the complete assembly is located inside the connector hood (connector 270 similar to connector 56, and a boot similar to boot 58).

In some embodiments, the power supply can comprise one or more components alternative to or in addition to a battery. For example, the power source can comprise one or more capacitors. In some embodiments, the present networking cables are configured such that if the cable is electrically connected to power-over-Ethernet (POE) power sourcing equipment (PSE), the PSE will deliver electric power to the cable even if the cable is not also electrically-connected to a separate POE-powered device (PD). For example, in some embodiments, the cable can comprise a resistor (which may be referred to as a POE resistor) incorporated into at least one of the connector hoods, the resistor being electrically connected to at least one of the conductor wire pairs in the cable (e.g., between connections 144 and 148 in circuit 120) such that if the cable is electrically connected to POE PSE, the PSE will deliver electric power to the cable even if the cable is not also electrically connected to a separate POE PD. Such a resistor can be of any suitable resistance (e.g., 25 kΩ) as required by one or more POE standards.

POE delivery generally includes a "handshake" or initiation process with an exchange of signals between the PSE and a PSD in which the PSE verifies that the PD is standard compliant and determines the maximum amount of power to be delivered to the PD. In general, once the handshake is completed and the PSE begins delivering power to the PD, the PSE will stop delivering power to the PD if the PD stops drawing power for a predetermined period of time (e.g., 100 seconds). In embodiments in which the cable is configured to demand POE power even if not connected to an external PD, the cable can include any suitable configuration capable of performing the initial "handshake" or initiation process with the PSE. For example, in some embodiments, the cable can be configured to demand an initial burst or relatively higher amount of power to set the maximum power level from the PSE relatively high (e.g., 1 W) and then maintain at least a minimal or relatively lower power demand (e.g., 0.01 W) continuously to ensure that the PSE does not stop delivering power to the cable. For example, in embodiments with a battery, the cable can be configured to (e.g., after the handshake process) only demand power above the minimal power level from the PSE if the battery is below a threshold value and is being charged, but to demand at least the minimal power level from the PSE even when the battery is not being charged to ensure the constant availability of power from the PSE. For example, one or both connector hoods can include an appropriate POE circuit (such as may be included in POE powered devices) incorporated into and/or in communication with the circuit that provides the tracing functionality described in this disclosure. In other embodiments, the cable is not configured to maintain a minimal power demand from the PSE after the handshake is completed, such that the cable will fully charge the battery when plugged in, but then allow the PSE to stop delivering power once the battery is fully charged.

In some embodiments, the cable comprises a charging circuit coupled to the at least one of the conductor wire pairs (to which the POE resistor is coupled) and configured such that if the cable is electrically connected to POE PSE, the charging circuit can communicate electric current from the PSE to the power source (e.g., a rechargeable battery, a capacitor, etc.). In some embodiments, the POE resistor is included in a PCB to which the controller is coupled. In some embodiments, the controller is configured such that if the cable is electrically connected to POE PSE, the controller can direct electrical current from the PSE (or, more specifically, the POE PSE) to the battery (e.g., if the battery falls below a threshold voltage, such as, for example, 60% of the battery's rated voltage). In some embodiments, the controller is configured to only direct electrical current from the POE PSE if the battery is below the threshold voltage. In such embodiments, the circuit (e.g., similar to circuit 120) can include a suitable charging subcircuit, as is known in the art.

In some embodiments, a Radio Frequency Identification circuit, often called an RFID tag, replaces or supplements integrated circuit 82. The use of an RFID tag can, for example, store information about a device to which one or both ends of the cable is connected, such as, for example, one or more of: the Media Access Control address (MAC address), the jack number, port address, IP address, workstation identifier, server identifier, and/or the other information. The user can then use an RFID reader to scan an end of the networking cable to obtain information about the location at which the opposite end of the cable is coupled without having to physically search for the other end of the cable.

Figure 10:
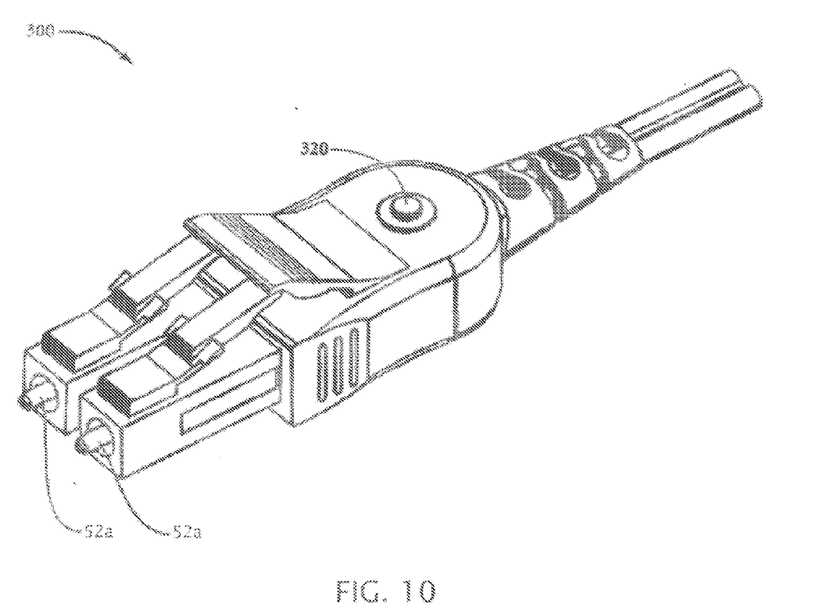
FIG. 10 is a perspective view of a fiber optic cable connector hood.
Figure 11:
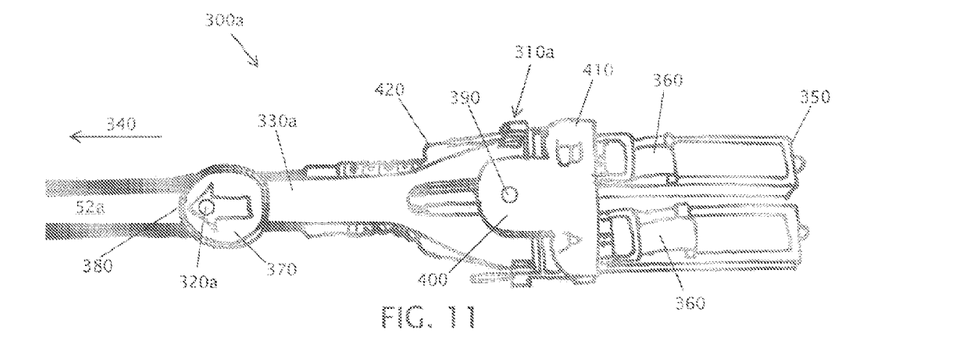
FIG. 11 is plan view of a first embodiment of a dual-fiber-optic cable connector hood with a remote release tab.

Referring now to FIGS. 10-14, the present cable tracer technologies and techniques can also be included in fiber optic cables. The present fiber optic cables generally comprise one or more optical fibers and one or more conductors (e.g., conductive wires) to communicate electrical current along the length of the optical fiber(s) to enable the tracing functionality. Examples of connectors for optical-fiber cables include single-fiber (e.g., LC) connectors, multi-fiber (e.g., MPO and/or MTP) connectors, and/or any other optical-fiber connectors (e.g., SC, ST, and the like). The electronics and functionality of the tracer testing may be very similar, if not identical, to that described above for the conductive-wire networking cables. For example, FIG. 10 illustrates one end of a traceable fiber optic cable system 300. An example of a dual-fiber optic connector 310 is shown with a button 320 that, in this embodiment, also serves as electrically activated telltale (i.e., a lighted button, in this embodiment). The enclosure contains the other elements (electric power source, PCB board, etc.) that operate the same way as in the non-fiber optic embodiments described above. Of course, because cable 300 is a fiber optic cable, separator 150 need not be included.

FIGS. 11-14 depict various embodiments of cables 300a, 300b, 300c with fiber-optic cable connector hoods 310a, 310b, 310c. Each of connector hoods 310a, 310b, 310c are similar in some respects to the remote-release connectors disclosed in U.S. Pat. No. 8,465,317 (the '317 Patent, which is incorporated by reference to the extent it provides details of various versions of remote-release connectors) in that each includes an extender or remote release tab (330a, 330b, 330c) which improves the ease of releasing the respective connector in high-density environments because the extender or remote release tab can simply be pulled by a user in a direction 340 away from a distal end 350 of the connector to laterally compress the lever(s) (360) of the connector toward the transmission line(s) 52a (e.g., optical fiber(s), in the embodiment shown). Each of connector hoods 310a, 310b, and 310c can be configured in any of various ways. For example, connector hood 310a of FIG. 11 includes a manually operated switch or button 320a incorporated into (e.g., disposed in and/or on) a lateral surface 370 (e.g., outwardly facing, relative to the optical fibers) of a proximal end 380 of extender 330a, and an electrically activated telltale 390 (i.e., LED, in this embodiment) incorporated into a lateral surface 400 of connector body 410. In this embodiment, the other components of the circuit (e.g., 120), such as the power source (e.g., battery 90), integrated circuit or chip (e.g., 124), and the various conductive paths between the components can be included in extender 330a and/or connector body 410 (including boot 420). For example, in some embodiments, the various components can be connected by a flexible circuit coupled to and extending along at least a portion of extender 330a, and which can be soldered or otherwise coupled to the tracing conductor(s) running along the length of the transmission line(s) (e.g., conductive pairs or fiber optic cables) to communicate with the second connector hood at the opposite end of the cable. While not shown, the embodiment depicted in FIG. 11 includes a second connector hood 310a at an opposite end of the cable and connected via the tracing conductor(s) (not independently shown, but running the length of cable 52a).

Figure 12:
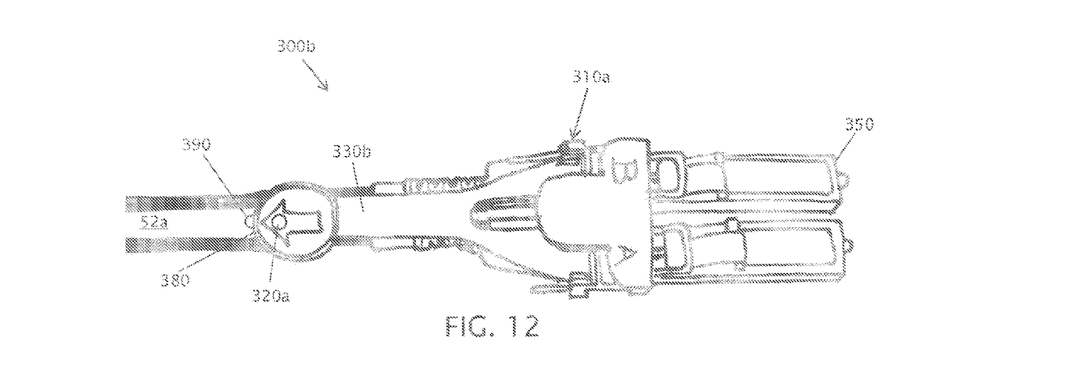
FIG. 12 is plan view of a second embodiment of a dual-fiber-optic cable connector hood with a remote release tab.

FIG. 12 depicts a first end of a second embodiment 300b of the present fiber optic cables. Cable 300b is similar to cable 300a with the primary exception that, in cable 300b, electrically activated telltale 390 (i.e., LED, in this embodiment) is incorporated into a proximal surface 420 (facing away from distal end 350) of proximal end 380 of extender 330b.

Figure 13:
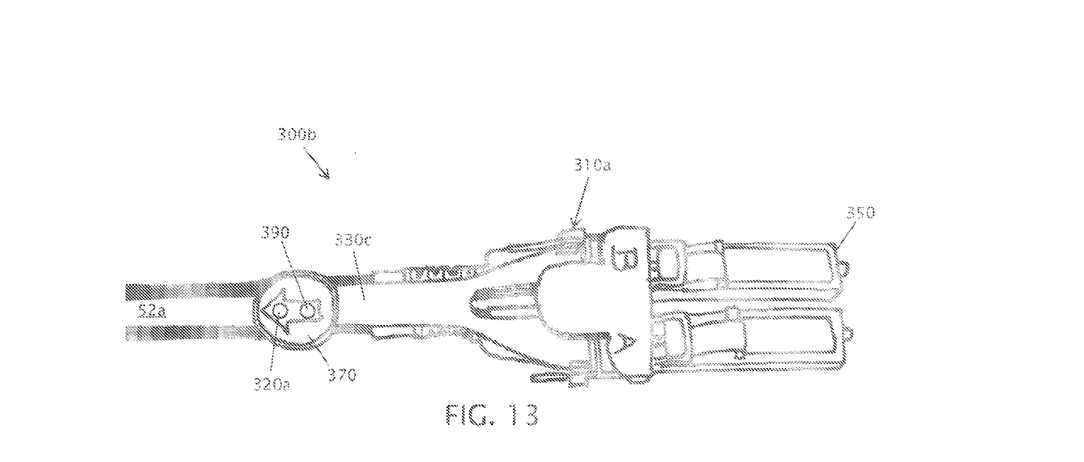
FIG. 13 is plan view of a third embodiment of a dual-fiber-optic cable connector hood with a remote release tab.

FIG. 13 depicts a first end of a third embodiment 300c of the present fiber optic cables. Cable 300c is similar to cables 300a and 300b with the primary exception that, in cable 300c, electrically activated telltale 390 (i.e., LED, in this embodiment) is incorporated into lateral surface 370 of proximal end 380 of extender 330c.

Figure 14:
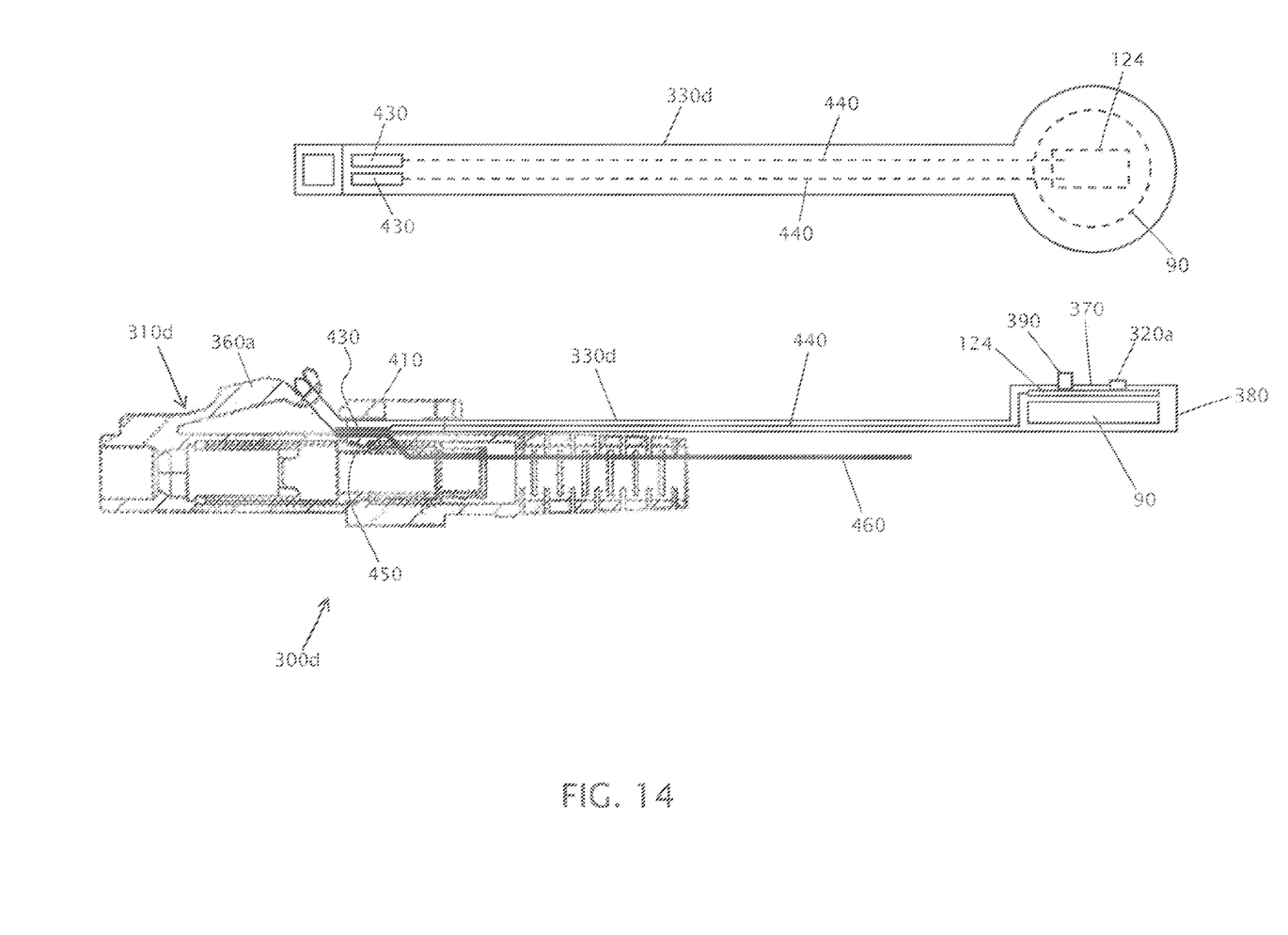
FIG. 14 includes cutaway side view of a fourth embodiment of a single-fiber-optic cable connector hood with a remote release tab, and an inset bottom view of an extender fo the connector hood.

FIG. 14 depicts cutaway side view of a first end of a fourth embodiment 300d of the present fiber-optic cables. Cable 300d is similar to cable 300c with the primary exception that cable 300d includes only a single fiber optic cable (which is omitted for clarity). As described in U.S. Pat. No. 8,465,317 (the '317 Patent), connector hood 310d includes extender 300d that is configured to be removably coupled to connector body 400a such that extender 300d can slide relative to connector body 400a to depress or compress lever 360a. In this embodiment, manually operated switch or button 320a and electrically activated telltale 390 are incorporated into (e.g., disposed in and/or on) a lateral surface 370 (e.g., outwardly facing, relative to the optical fibers) of proximal end 380 of extender 330d, and the other components of the circuit (e.g., 120), such as the power source (e.g., battery 90), integrated circuit or chip (e.g., 124) are also incorporated into extender 330a. In this and other embodiments, the tracing circuit also includes at least one (e.g., two, in the embodiment shown) first conductive contact 430 disposed on and/or otherwise exposed to an exterior of extender 330d and coupled to the tracing circuit via one or more (e.g., two, in the embodiment shown) conductors 440 (which may be unitary with contact(s) 430). In this and other embodiments, cable 300d further includes at least one (e.g., two, in the embodiment shown) second conductive contacts 450 incorporated into (e.g., disposed on and/or in connector body 400 or boot 420 and in electrical communication (e.g., unitary) with the at least one (e.g., two, in the embodiment shown) tracing conductor 460 running along the length of the transmission line(s). In this embodiment, the at least one first conductive contact (430) is configured to contact the at least one second conductive contact (450) to provide an electrical connection between the tracing circuit and the at least one conductor (460) that can be maintained during movement of extender 330d relative to connector body 410. In this embodiment, conductors 440 and/or integrated circuit 124 can be included in a flexible circuit or flex circuit that is affixed to and/or molded into extender 330d.

The above specification and examples provide a complete description of the structure and use of exemplary embodiments. Although certain embodiments have been described above with a certain degree of particularity, or with reference to one or more individual embodiments, those skilled in the art could make numerous alterations to the disclosed embodiments without departing from the scope of this invention. As such, the various illustrative embodiments of the present devices are not intended to be limited to the particular forms disclosed. Rather, they include all modifications and alternatives falling within the scope of the claims, and embodiments other than the one shown may include some or all of the features of the depicted embodiment. For example, components may be combined as a unitary structure (e.g., connector 56 and boot 58 may be formed as a unitary piece). Further, where appropriate, aspects of any of the examples described above may be combined with aspects of any of the other examples described to form further examples having comparable or different properties and addressing the same or different problems. Similarly, it will be understood that the benefits and advantages described above may relate to one embodiment or may relate to several embodiments.

The claims are not intended to include, and should not be interpreted to include, means-plus- or step-plus-function limitations, unless such a limitation is explicitly recited in a given claim using the phrase(s) "means for" or "step for," respectively.

The invention claimed is:

1. A networking cable for transmitting data, comprising:
   one or more transmission lines encased in a flexible sheath;
   a connector hood on each end of the networking cable, each connector hood comprising:
   a distal end configured to extend into a mating connector or jack;

a lever configured to engage the mating connector or jack to resist removal of the distal end; and
an extender configured to be coupled to the lever and configured to be pulled longitudinally away from the distal end to draw a portion of the lever laterally toward one or more cables
at least one conducting wire deployed along the length of the one or more transmission lines;
an electrically activated telltale incorporated into one of the connector hoods;
an electric power source incorporated into one of the connector hoods;
a manually operated switch incorporated into one of the connector hoods and electrically connected to the electrically activated telltale, the electric power source, and the at least one conductor, and configured to be actuated to activate the electrically activated telltale;
where the electrically activated telltale is mounted on the extender of the connector hood, and a flexible circuit extends along at least a portion of a length of the extender and is electrically coupled to the electrically activated telltale and the manually operated switch.

2. The networking cable of claim 1, further comprising:
a second electrically activated telltale incorporated into the other of the connector hoods;
where the manually operated switch is configured be actuated to activate both telltales.

3. The networking cable of claim 1, where the manually operated switch is coupled to the extender of the connector hood.

4. The networking cable of claim 1, where the electric power source is incorporated into the extender of the connector hood.

5. The networking cable of claim 1, where the one or more transmission lines comprise one or more fiber optic cables.

6. The networking cable of claim 1, where the electrically activated telltale emits an audio or visual signal.

7. The networking cable of claim 1, where the electrically activated telltale is selected from the group consisting of a light emitting diode, a conventional light bulb, and a liquid crystal visual indicator.

8. The networking cable of claim 1, where the electric power source includes a battery.

9. A networking cable for transmitting data, comprising:
one or more transmission lines encased in a flexible sheath;
a connector hood on each end of the networking cable, each connector hood comprising:
a distal end configured to extend into a mating connector or jack;
a lever configured to engage the mating connector or jack to resist removal of the distal end; and
an extender configured to be coupled to the lever and configured to be pulled longitudinally away from the distal end to draw a portion of the lever laterally toward one or more cables
at least one conducting wire deployed along the length of the one or more transmission lines;
an electrically activated telltale incorporated into one of the connector hoods;
an electric power source incorporated into one of the connector hoods;
a manually operated switch incorporated into one of the connector hoods and electrically connected to the electrically activated telltale, the electric power source, and the at least one conductor, and configured to be actuated to activate the electrically activated telltale;

where:
at least one of the connector hoods further comprises a connector body, and the extender is slidably coupled to the connector body;
the extender is configured to be removably coupled to the connector body;
the extender comprises a circuit that includes the electrically activated telltale, the electric power source, the manually operated switch, and at least one first conductive contact;
the at least one conductor is in electrical communication with at least one second conductive contact on the connector body; and
the at least one first conductive contact is configured to contact the at least one second conductive contact to provide an electrical connection between the circuit and the at least one conductor that can be maintained during movement of the extender relative to the connector body.

10. The networking cable of claim 9, further comprising:
a second electrically activated telltale incorporated into the other of the connector hoods;
where the manually operated switch is configured be actuated to activate both telltales.

11. The networking cable of claim 9, where the manually operated switch is coupled to the extender of the connector hood.

12. The networking cable of claim 9, where the electric power source is incorporated into the extender of the connector hood.

13. The networking cable of claim 9, where the one or more transmission lines comprise one or more fiber optic cables.

14. The networking cable of claim 9, where the electrically activated telltale emits an audio or visual signal.

15. The networking cable of claim 9, where the electrically activated telltale is selected from the group consisting of a light emitting diode, a conventional light bulb, and a liquid crystal visual indicator.

16. The networking cable of claim 9, where the electric power source includes a battery.

17. A method of assembling a connector hood for a networking cable, the method comprising:
coupling an extender to a connector body such that the extender can slide relative to the connector body, where:
the connector body comprises:
a distal end configured to extend into a mating connector or jack; and
a lever configured to engage the mating connector or jack to resist removal of the distal end;
the extender is coupled to the lever such that the extender can be pulled longitudinally away from the distal end to draw a portion of the lever laterally inward toward a longitudinal axis of the connector body;
an electrically activated telltale incorporated into one of the connector body and the extender; and
a manually operated switch is incorporated into one of the connector body and the extender, and electrically connected to the electrically activated telltale;
where the electrically activated telltale is coupled to the extender of the connector hood, and a flexible circuit is incorporated into the extender and electrically coupled the electrically activated telltale and the manually operated switch.

18. The method of claim 17, where the connector hood is coupled to a cable that comprises one or more transmission lines and at least one conducting wire deployed along the length of the one or more transmission lines.

19. The method of claim 18, where:
   an electric power source is incorporated into one of the connector body and the extender; and
   the manually operated switch is electrically connected to the electrically activated telltale, the electric power source, and the at least one conductor, and configured to be actuated to activate the electrically activated telltale.

20. The method of claim 17, where the manually operated switch is coupled to the extender of the connector hood.

21. The method of claim 17, where the electric power source is coupled to the extender of the connector hood.

22. A method of assembling a connector hood for a networking cable, the method comprising:
   coupling an extender to a connector body such that the extender can slide relative to the connector body, where:
      the connector body comprises:
         a distal end configured to extend into a mating connector or jack; and
         a lever configured to engage the mating connector or jack to resist removal of the distal end;
      the extender is coupled to the lever such that the extender can be pulled longitudinally away from the distal end to draw a portion of the lever laterally inward toward a longitudinal axis of the connector body;
      an electrically activated telltale incorporated into one of the connector body and the extender; and
      a manually operated switch is incorporated into one of the connector body and the extender, and electrically connected to the electrically activated telltale;
   where:
      the extender is configured to be removably coupled to the connector body;
      the extender comprises a circuit that includes the electrically activated telltale, the manually operated switch, and at least one first conductive contact;
      at least one second conductive contact is incorporated into the connector body; and
      the at least one first conductive contact is configured to contact the at least one second conductive contact to provide an electrical connection between the circuit and the at least one second conductive contact that can be maintained during movement of the extender relative to the connector body.

* * * * *